United States Patent
Olivares, II et al.

(10) Patent No.: US 10,051,328 B2
(45) Date of Patent: Aug. 14, 2018

(54) SYSTEM AND METHOD FOR COMPOSING FUNCTION PROGRAMMING FOR ADULT TOY OPERATION IN SYNCHRONIZATION WITH VIDEO PLAYBACK

(71) Applicant: SHENZHEN LOVE SENSE TECHNOLOGY CO., LTD., Shenzhen (CN)

(72) Inventors: Eddy J. D. Olivares, II, Shenzhen (CN); Dan Liu, Shenzhen (CN)

(73) Assignee: SHENZHEN LOVE SENSE TECHNOLOGY CO., LTD., Nanshan District, Shenzhen (CN)

( * ) Notice: Subject to any disclaimer, the term of this patent is extended or adjusted under 35 U.S.C. 154(b) by 46 days.

(21) Appl. No.: 15/187,465

(22) Filed: Jun. 20, 2016

(65) Prior Publication Data
US 2017/0366858 A1    Dec. 21, 2017

(51) Int. Cl.
*H04N 21/472*    (2011.01)
*H04N 21/41*    (2011.01)
(Continued)

(52) U.S. Cl.
CPC ....... *H04N 21/47217* (2013.01); *A61H 19/00* (2013.01); *A61H 23/02* (2013.01);
(Continued)

(58) Field of Classification Search
CPC ......... H04N 21/47217; H04N 21/4104; H04N 21/43615; G06F 3/04847; H04W 4/008;
(Continued)

(56) References Cited

U.S. PATENT DOCUMENTS 6,733,360 B2    5/2004    Dooley et al.
7,716,376 B1    5/2010    Price et al.
(Continued)

FOREIGN PATENT DOCUMENTS

EP    1 411 424 A2    9/2003
WO    WO 2015/135147    9/2015

OTHER PUBLICATIONS

International Search Report dated Sep. 13, 2017 for International Application No. PCT/US17/38227.

*Primary Examiner* — Thai Tran
*Assistant Examiner* — Nien-Ru Yang
(74) *Attorney, Agent, or Firm* — F. Chau & Associates, LLC

(57) ABSTRACT

A method for programming a tactile stimulation device includes displaying a video playback scrubber showing a video in conjunction with a timeline and providing navigation controls for playing, advancing, and regressing the display of the video. A control panel for selecting an operational mode of the tactile stimulation device is displayed concurrently with the video playback scrubber. Commands are received either via the displayed control panel or by keyboard, each of the commands selects the operational mode and an associated period of time. Each of the commands is graphically represented on the displayed timeline according to the selected periods of time. The commands are saved, along with the associated selected periods of time, either as an independent file or annotated within the video file.

20 Claims, 7 Drawing Sheets

(51) Int. Cl.
  *G11B 27/34* (2006.01)
  *G11B 27/11* (2006.01)
  *H04N 21/436* (2011.01)
  *A61H 19/00* (2006.01)
  *A61H 23/02* (2006.01)
  *H04N 21/478* (2011.01)
  *H04W 4/80* (2018.01)
  *H04W 76/14* (2018.01)

(52) U.S. Cl.
  CPC .............. *G11B 27/11* (2013.01); *G11B 27/34* (2013.01); *H04N 21/4104* (2013.01); *H04N 21/43615* (2013.01); *H04N 21/478* (2013.01); *H04W 4/80* (2018.02); *H04W 76/14* (2018.02); *A61H 2201/5097* (2013.01); *A61H 2205/087* (2013.01)

(58) Field of Classification Search
  CPC ..... H04W 76/023; A61H 19/00; A61H 23/02; A61H 2201/5097; A61H 2205/087; G11B 27/11; G11B 27/34
  USPC .......................................................... 386/200
  See application file for complete search history.

(56) References Cited

U.S. PATENT DOCUMENTS

| | | | |
|---|---|---|---|
| 2004/0225713 A1* | 11/2004 | Abbasi | H04L 29/06 709/203 |
| 2007/0055096 A1 | 3/2007 | Berry et al. | |
| 2009/0210779 A1* | 8/2009 | Badoiu | G06F 17/3082 715/230 |
| 2013/0198625 A1* | 8/2013 | Anderson | G06F 3/016 715/701 |
| 2013/0340004 A1 | 12/2013 | Prestenback et al. | |
| 2014/0026051 A1* | 1/2014 | Roh | G06F 17/30849 715/720 |
| 2014/0165086 A1 | 6/2014 | Avedissian et al. | |
| 2015/0328082 A1 | 11/2015 | Jiang et al. | |

* cited by examiner

SYSTEM AND METHOD FOR COMPOSING FUNCTION PROGRAMMING FOR ADULT TOY OPERATION IN SYNCHRONIZATION WITH VIDEO PLAYBACK

TECHNICAL FIELD

The present disclosure relates to function programming and, more specifically, to systems and methods for composing function programming for adult toy operation in synchronization with video playback.

DISCUSSION OF THE RELATED ART

Adult toys are devices designed for tactile stimulation of a user. Adult toys may be able to produce a wide range of movements, referred to herein as "operational modes," at a wide range of settings, referred to herein as "operational parameters." These operational modes can provide tactile stimulus by various movements such as vibrations and other repetitive movements.

For each operational mode, the various operational parameters may set such features as speed, frequency, force, amplitude, radius of movement, etc. Traditionally, a user has been responsible for manually activating the device and switching between its many operational modes and parameters.

More recently, adult toys have been designed that allow for pre-programmed operation in which a user can select between multiple pre-programmed routines of operational modes and parameters.

SUMMARY

A method for programming a tactile stimulation device includes displaying a video playback scrubber, the video playback scrubber being configured to display a video file in conjunction with a timeline showing a time and relative position of a present frame of the video file and providing navigation controls for playing, advancing, and regressing the display of the video file. A control panel for selecting at least one operational mode of the tactile stimulation device is displayed concurrently with the displaying of the video playback scrubber. One or more commands are received either via the displayed control panel or by keyboard, for example, as shortcut keystrokes, each of the one or more commands selecting the operational mode of the tactile stimulation device for a selected period of time within the video playback. Each of the received one or more commands is graphically represented on the displayed timeline according to their selected periods of time. The received one or more commands are saved, along with the associated selected periods of time, either as an independent file or annotated within the video file.

The video file may be played on a display device as an operation of the tactile stimulation device is controlled by reading the saved one or more commands along with the associated selected periods of time.

The saved independent file or the annotated video file may be uploaded to a to a file sharing platform.

The one or more commands, along with the associated selected periods of time, may be annotated within the video file as metadata or as subtitle information.

The displayed control panel may be further configured for selecting at least one operational parameter for each of the at least one operation mode of the tactile stimulation device, and each of the received one or more commands may further select the at least one operational parameter, the selected operational parameter may also be graphically represented on the displayed timeline, and the selected operational parameter may also be saved as part of the one or more commands.

The tactile stimulation device may be an adult toy/sex toy.

The video playback scrubber and the control panel may be displayed together on a personal computer, a tablet computer, a smartphone, or a virtual reality/augmented reality headset.

The video playback scrubber may be displayed on a computer monitor or television and the control panel may be displayed on a tablet computer or a smartphone.

The displayed timeline may span an entire playing time of the video file.

The tactile stimulation device may be identified prior to displaying the control panel and the control panel may be displayed according to particular capabilities of the identified tactile stimulation device. The tactile stimulation device may be identified via a wired connection or a paired wireless connection.

The display device may be part of a personal computer, tablet computer, smartphone, or a virtual reality/augmented reality headset.

A system for a programmable tactile stimulation device includes a tactile stimulation device paired to a computer device over a wired or wireless connection, the computer device executing an application programmed to identify a type of the tactile stimulation device, display a video playback scrubber, the video playback scrubber being configured to display a video file in conjunction with a timeline showing a time and relative position of a present frame of the video file and providing navigation controls for playing, advancing, and regressing the display of the video file, display a control panel for the identified type of the tactile stimulation device, the control panel configured for selecting at least one operational mode of the tactile stimulation device, receive one or more commands via either the displayed control panel or by keyboard, each of the one or more commands selecting the operational mode of the tactile stimulation device for a selected period of time within the video playback, graphically represent each of the received one or more commands on the displayed timeline according to their selected periods of time, and save the received one or more commands along with the associated selected periods of time, either as an independent file or annotated within the video file.

The computer device may be a personal computer, a tablet computer, or a smartphone.

A set top box may be paired to the tactile stimulation device via the wired or wireless connection. The set top box may be configured to play the video file on a display device connected to the set top box on the direction of the computer device as the tactile stimulation device is directed to perform the saved one or more commands along with the associated selected periods of time, on the direction of the computer device.

A file sharing server may be configured to receive the saved one or more commands along with the associated selected periods of time and share the saved one or more commands along with the associated selected periods of time to a plurality of users.

A computer system includes a processor and a non-transitory, tangible, program storage medium, readable by the computer system, embodying a program of instructions executable by the processor to perform method steps for programming a tactile stimulation device. The method includes displaying a video playback scrubber, the video playback scrubber being configured to display a video file in conjunction with a timeline showing a time and relative position of a present frame of the video file and providing navigation controls for playing, advancing, and regressing the display of the video file, displaying a control panel for selecting at least one operational mode of the tactile stimulation device and for selecting at least one operational parameter for the at least one operational mode, receiving one or more commands either via the displayed control panel or by keyboard, each of the one or more commands selecting the operational mode of the tactile stimulation device, along with an operational parameter for the selected operational mode, for a selected period of time within the video playback, graphically representing each of the received one or more commands on the displayed timeline according to their selected periods of time, and saving the received one or more commands along with the associated selected periods of time, either as an independent file or annotated within the video file.

The one or more commands, along with the associated selected periods of time, may be annotated within the video file as metadata or as subtitle information.

The tactile stimulation device may be identified via a paired wired or wireless connection prior to displaying the control panel and the control panel may be displayed according to particular capabilities of the identified tactile stimulation device.

The at least one operational mode may include vibration and the at least one operational parameter may include vibration speed.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
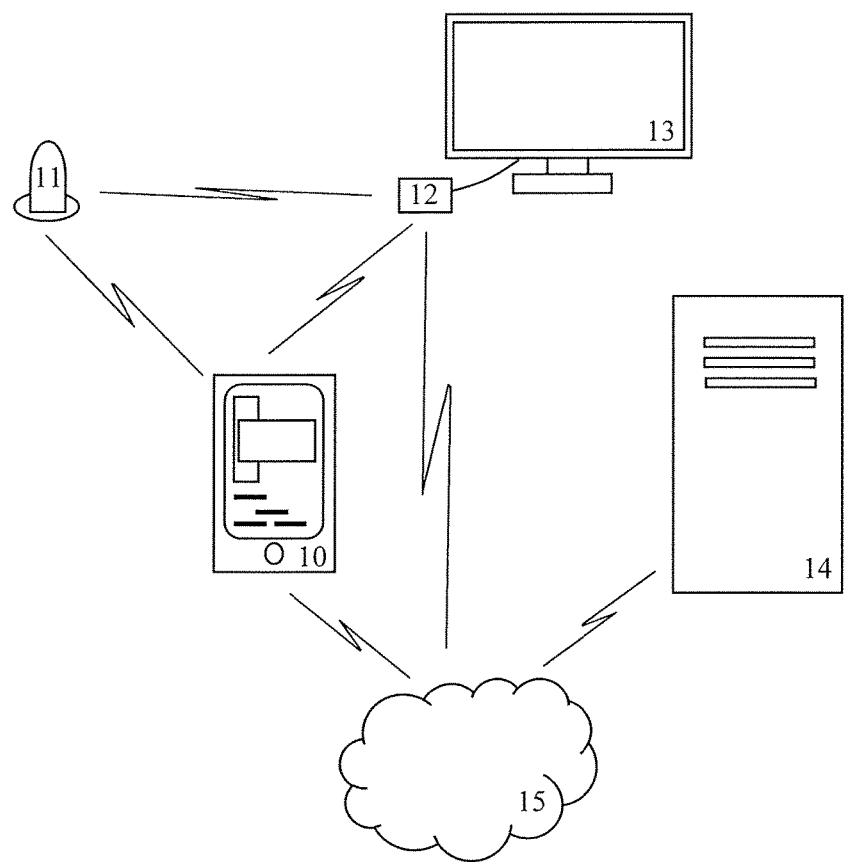
FIG. 1 is a schematic diagram illustrating a system for composing, editing, playing and sharing functional programming for adult toy device operation in synchronization with video playback in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide systems and methods for composing function programming for adult toys. The functional programming may be synchronized with the playback of a particular video. While composition may be performed either by monitoring the manual controls of the adult toys, exemplary embodiments of the present invention allow for the use of a graphical user interface (GUI) for composing the programming, from scratch, or for the editing of such functional programming regardless of whether the functional programming was composed from-scratch or by monitoring the manual controls. As the functional programming is tied to the timing of the playback of a corresponding video, the functional programming may be referred to herein as "subtitles."

The subtitles may therefore include a sequence of instructions designating the operational mode and operational parameters for one or more toy devices. The instructions may be tied to a time stamp for an associated video, and together, the operational mode, operational parameters and time stamp may be referred to herein as an "Action Note."

FIG. 1 is a schematic diagram illustrating a system for composing, editing, playing and sharing functional programming for adult toy device operation in synchronization with video playback in accordance with exemplary embodiments of the present invention. There may be one or more toy devices 11. Each toy device may have its own set of capabilities that include one or more operational modes and/or one or more operational parameters per operational mode. For example, a given toy device 11 may have a first operational mode of vibrate, a second operational mode of gyrate and a third operational mode of oscillate. The vibrate operational mode may have a first operational parameter of frequency and a second operational parameter of amplitude. The gyrate operational mode may have a first operational parameter of radius and a second operational parameter of speed. The oscillate operational mode may have a first operational parameter of distance and a second operational parameter of speed. The toy device may be capable of performing all three functions for any given parameters or there may be restrictions on operations such as some operational modes being mutually exclusive.

Each toy device might store data defining its operational modes and available operational parameters, and this data may be transmitted to a host device 10 when paired thereto, for example, via a BLUETOOTH wireless connection. Alternatively, or additionally, one or more of the toy devices may be paired to the host device 10 by a wired connection, for example, a USB connection, and in this case, the operational mode data may be transmitted to the host via the USB connection for toy device identification.

Rather than receiving the available operational modes and parameters from the toy device, the host device 10 may look up this data based on a device ID received from the toy device 11. The host device 10 may be a personal computer, a laptop computer, a tablet computer, a smartphone or any other type of computer device. Any number of toy devices 11 may be concurrently associated to the host device 10.

The host device 10 may be connected to a central server 14, for example, over the Internet 15. The host device 10 may also be connected to, or otherwise able to stream video content to, a set-top-box (STB) device 12. The STB device 12 is connected to a display device (e.g. television or monitor) 13 for playing back video content. The STB device 12 may stream video data directly from the host device 10 or may stream video over the Internet 15, with or without the direction of the host device 10. The subtitle programming may be sent to the toy device 11 either from the host device 10 or from the STB device 12, either in real-time as the video is played on the display device 13, or beforehand to be cached therein.

The central server 14 may be used to host the streaming video content or otherwise make this content available for download. The central server 14 may also be accessed by the host device 10, for example, over the Internet 15, for the purposes of uploading/downloading the subtitle programming. For example, the central server 14 may allow for the sharing and/or distribution of professionally made or user-made subtitle programming content.

The host device 10 may also execute an application ("app") for allowing a user to create and/or edit a subtitle program via GUI, either alone, or in conjunction with the STB device 12. GUI elements and/or video scrubbing playing may be provided on the host device 10 and/or the display device 13.

Figure 2:
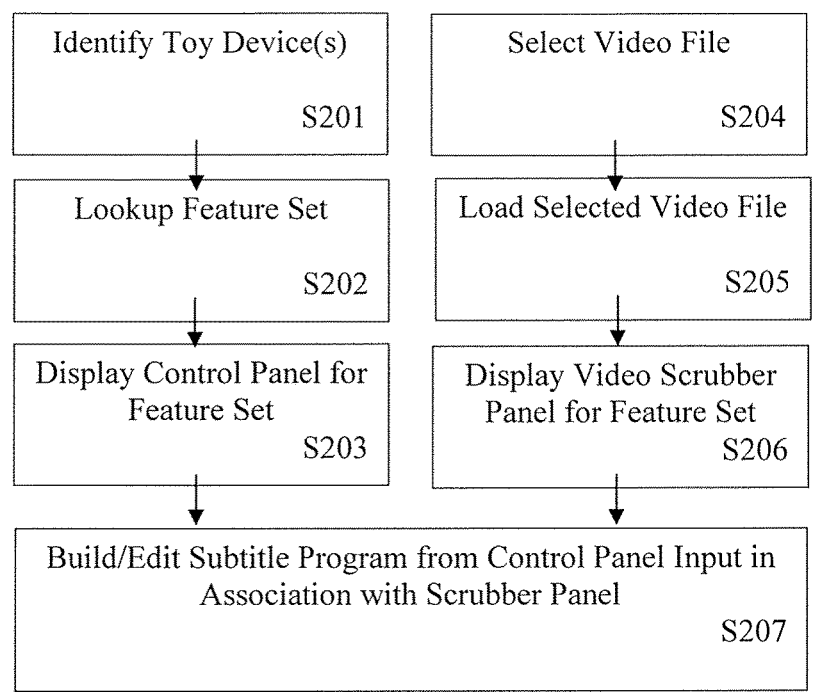
FIG. 2 is a flow chart illustrating an approach for generating and editing subtitle programming in synchronization with video playback in accordance with exemplary embodiments of the present invention.

As discussed above, exemplary embodiments of the present invention may be used to generate, edit, share and play subtitle programming in synchronization with video playback. FIG. 2 is a flow chart illustrating an approach for generating and editing subtitle programming in synchronization with video playback in accordance with exemplary embodiments of the present invention. As discussed above, the various toy devices may be paired to the host device. This may include identifying the one or more toy devices that are available for being added to the subtitle program (Step S201). As a single subtitle program may be used to control multiple toy devices, more than one toy devices may be so identified. However, for the purposes of providing a clear explanation, exemplary embodiments of the present invention may be described herein in terms of identifying a single toy device.

It is contemplated that at this step, the host device may be able to perform a search feature in which it searches for compatible toy devices that may be amendable to connection. The connection need not be performed via Bluetooth, as other wireless means of connection may be used such as WiFi, RF control, infrared remote control, etc.

After the toy device has been identified, a feature set may be looked up for the toy device (Step S202). This feature set may define which operational modes are available to the toy device, and which operational parameters are available for each operational mode. Looking up this information may include receiving this information directly from the toy device, where it may be stored as data in firmware, or this information may be looked up from a database of toy devices and operational modes/parameters based on a device ID for the toy device received therefrom.

Based on the available operational modes/parameters, a control panel may be displayed to the user (Step S203), either on the host device or the display device via the STB. The control panel may be a GUI element representing each operational mode and some selection element for selecting from available operational parameters. For example, these GUI elements may look like one or more knobs or sliders representing the operational parameters for each operational mode.

The user may also be prompted to select a video file (Step S204), for example, based on a locally stored video library and/or a library of video content available for streaming and/or downloading. The selected video file may be loaded or the stream may be initiated (Step S205). Thereafter, the video may be displayed as a scrubber, either in the host device, the display device, or on both at the same time (Step S206). The scrubber may be a window for displaying the video along with some representation of the complete length of the video so the user can jump to desired segments of the video or play the video back at any desired speed. The user may even be able to step frame-by-frame through the video. This mode of video display is referred to herein as "scrubbing."

The user may then use the control panel for the toy device and the video scrubber window to navigate to a desired place in the video and then add the desired operational mode/parameter instructions thereat (Step S207). Another GUI element may be displayed representing which operational modes are initiated at which times through the full sequence of the video. This element may be displayed as bars that span a range equal to the playing time of the video and each activation of an operational mode may be illustrated as a bar spanning the representative time. There may be a different area spanning the full length of the video for each available operational mode and the operational parameters need not be expressed, or may be expressed as a color or thickness of the bar.

Figure 3:
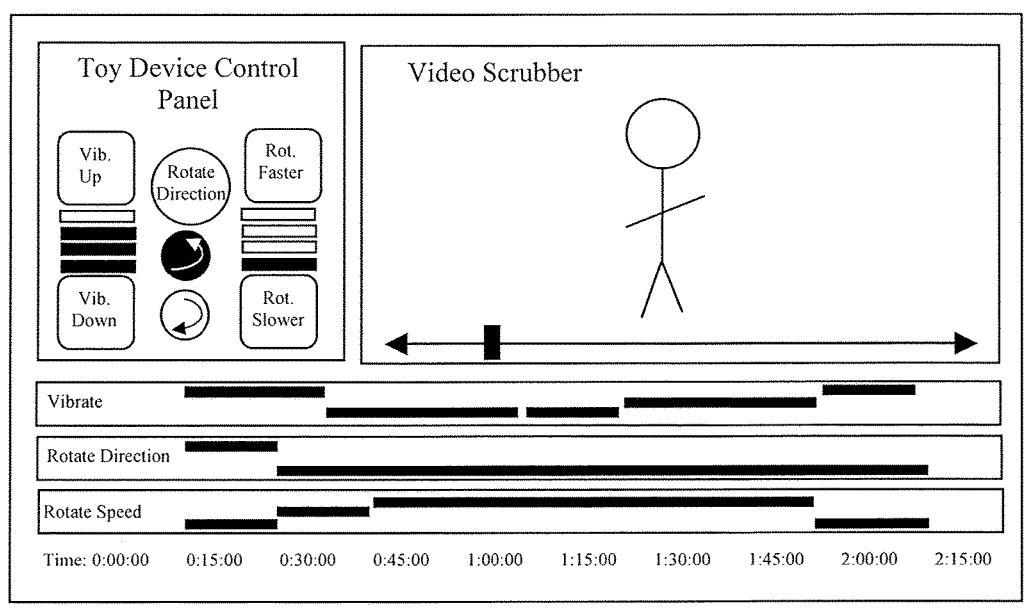
FIG. 3 is a schematic diagram illustrating a sample GUI for creating/editing subtitle programs for controlling toy devices in accordance with exemplary embodiments of the present invention.

FIG. 3 is a schematic diagram illustrating a sample GUI for creating/editing subtitle programs for controlling toy devices in accordance with exemplary embodiments of the present invention. As can be seen, there is a toy device control panel for the user to control the desired operational modes and set the desired operational parameters at the desired time. There is a video scrubber for displaying and stepping through the video. There are also program bars representing the operational modes of vibrate, rotate direction, and rotate speed, with each of these operational modes having an associated value spanning a given start and end time.

As discussed above, the user may have the option to playback the video and then manually control the toy device to activate the desired operational modes with the desired operational parameters at the desired times and then the user may have the ability to edit the subtitle program, so recorded, using the GUI elements discussed above.

Figure 4:
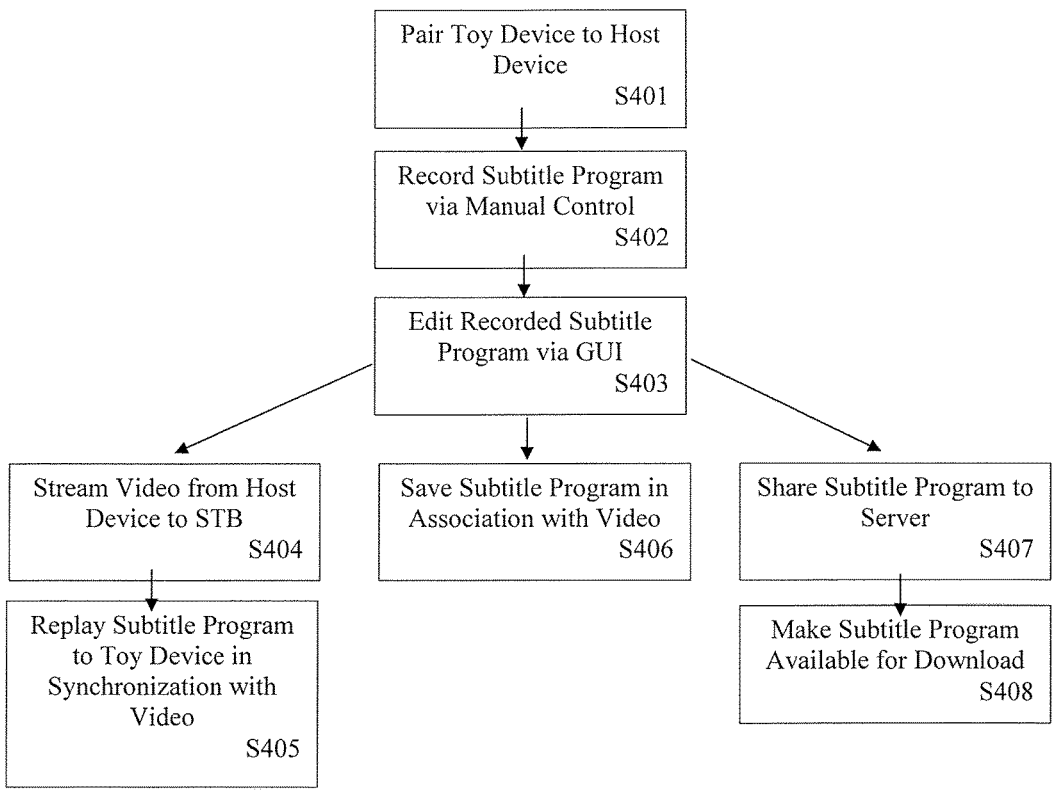
FIG. 4 is a flowchart illustrating an approach for generating, editing, playing and sharing subtitle programming in synchronization with video playback in accordance with exemplary embodiments of the present invention.

FIG. 4 is a flowchart illustrating an approach for generating, editing, playing and sharing subtitle programming in synchronization with video playback in accordance with exemplary embodiments of the present invention. As described above, first the toy device may be paired to the host device (Step S401). Thereafter, a subtitle program may be recorded by the user manually controlling the operational modes/parameters of the toy device as the video plays, for example, on the display device (Step S402). Then, the host device may be used to edit the recorded subtitle program, for example, as discussed above using the above-described GUI (Step 403). Thereafter the video may be played, for example, on the display device via the STB or directly on the host device (Step S404) and as the video is played, the program subtitle is run on the toy in synchronization with the video play (Step S405). The program subtitle may be stored either on the host device, on the STB, or directly on the toy device. Where it is stored on the toy device, a synchronization procedure may be performed to ensure that the payback of the video is kept in sync with the subtitle program, for example, by sending video time location, periodically or continuously, to the toy device. However, where the program is stored in the host device or STB, the host device/STB may run the subtitle to determine when an action note is due, based on the programmed operational modes/parameters, and the action notes may be sent to the toy device at just the right time so that the toy device can implement the received action note at the right time.

The user may have the ability to pause the video playback and according to one exemplary embodiment of the present invention, the user may be able to select from two forms of pause, there may be a "full pause," in which the toy device is instructed to stop functioning until the un-pause command is received, or the user may select an "active pause" in which the video playback temporarily pauses but the toy device maintains its operation in effect at the time of pausing. The user may even have the ability to override the subtitle program at any time during playback by manually selecting operational modes/parameters.

Rather than running the subtitle program, the user may save the generated/edited subtitle program in association with the particular video (Step S406). The subtitle program may be saved, for example, as an independent script file with an identifier identifying the associated video, or as metadata within the video file itself. According to one exemplary embodiment of the present invention, the generated/edited subtitle program may be stored as closed captioned subtitle information within the video file. As a video file may have subtitles of many different languages associated therewith, the user may have multiple subtitle programs, each stored as a different subtitle language. In this way, the subtitle program may be stored within a conventional video file without breaking backwards compatibility with existing playback methods, and the only way the conventional user would see the subtitle program is if he or she were to activate subtitling in which case the user may see representations of the action notes at their designated times, as if they were actual subtitles.

The user may also choose to share the programmed/edited subtitle programs with a share server (Step S407) where the subtitle programs may be made available to other users for download/streaming (Step S408).

As described above, the subtitle program may include a sequence of action notes, each of which designates an operational mode and/or operational parameter with an associated time stamp. The subtitle program may also include a header designating the associated video, and may include other metadata such as the author and time/date of creation/editing. The action notes may be succinctly expressed as a sequence of numbers representing, for example, the toy device ID, the operational mode, the operational parameter, the start time, and end time, or similar data.

Where the subtitle program is stored as a separate file, either locally or on the server, the file may have associated metadata that describes the associated video file, for example, including file name, video length, video title, video author, copyright information, MD5 signature, etc.

Once on the server, the subtitle programs may be made available for sharing as part of a website or app store, and other users may use and rate the subtitle programs.

Figure 5:
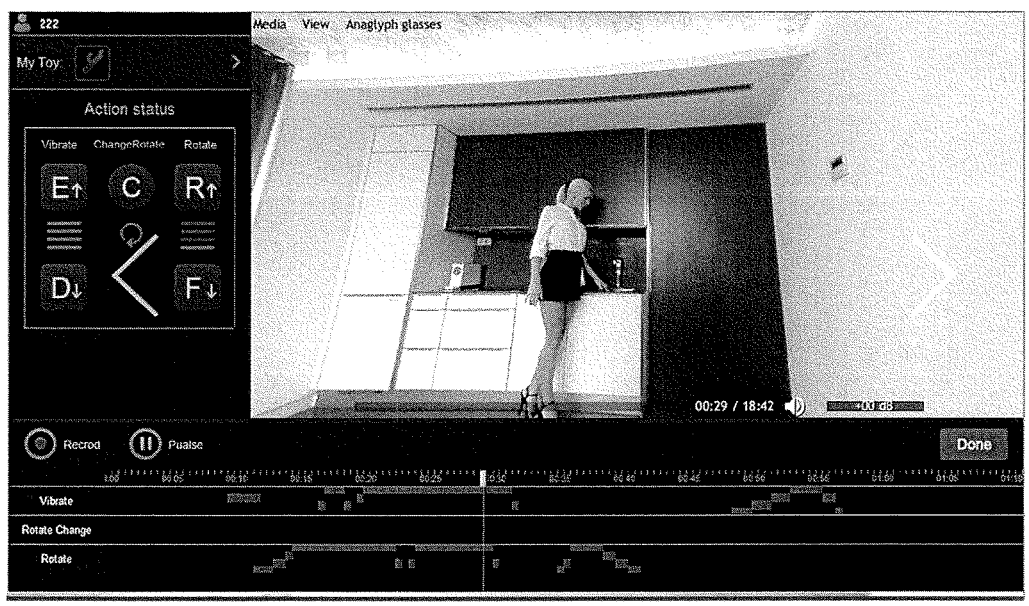
FIG. 5 is a sample screen rendering illustrating a GUI for creating and editing a subtitle program in accordance with exemplary embodiments of the present invention.
Figure 6:
FIG. 6 is a sample screen rendering illustrating a GUI for playing a video for which a subtitle program has been created in accordance with exemplary embodiments of the present invention.

FIG. 5 is a sample screen rendering illustrating a GUI for creating and editing a subtitle program in accordance with exemplary embodiments of the present invention and FIG. 6 is a sample screen rendering illustrating a GUI for playing a video for which a subtitle program has been created in accordance with exemplary embodiments of the present invention. As may be seen from FIG. 6, a present action note may be graphically represented as the video plays. A display such as this may be provided on the host device, for example, as the full video is played on the display device or a display such as this may be provided on the display device. In either case, the user may have the ability to show the video in full screen or bring back the GUI. The user may even be given an opportunity to pull up the subtitle program editing GUI to make edits to the subtitle program.

Figure 7:
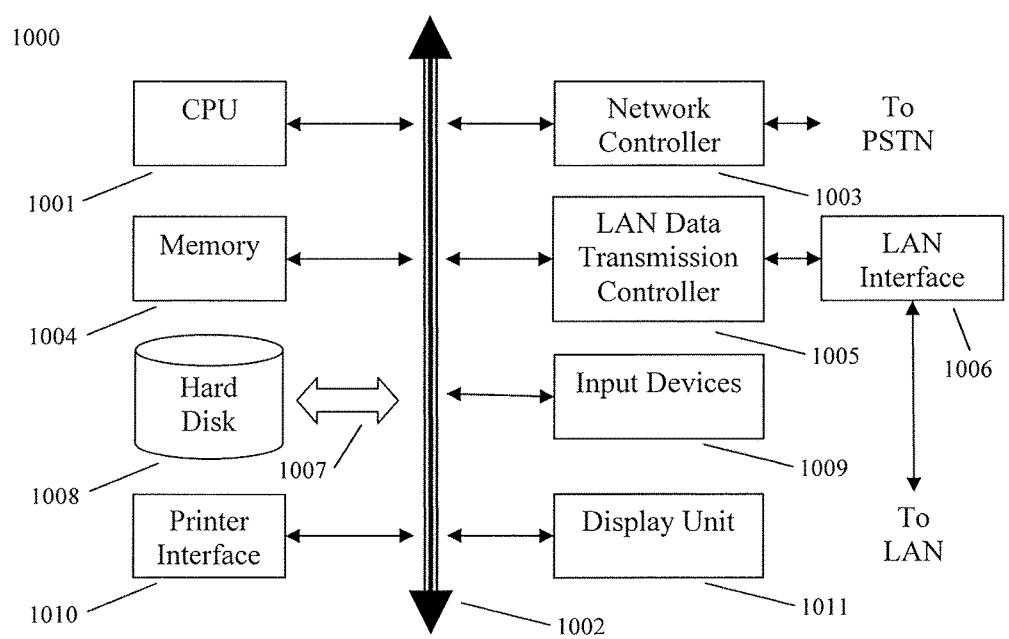
FIG. 7 shows an example of a computer system capable of implementing the method and apparatus according to embodiments of the present disclosure.

FIG. 7 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for programming a tactile stimulation device, comprising:

displaying a video playback scrubber, the video playback scrubber being configured to display a video file of a pre-recorded video in conjunction with a timeline showing a time and relative position of a present frame of the video file and providing navigation controls for playing, advancing, and regressing the display of the video file;

displaying a control panel for selecting at least one operational mode of the tactile stimulation device concurrently with the displaying of the video playback scrubber;

receiving one or more commands for the tactile stimulation device, either via the displayed control panel or by keyboard, each of the one or more commands for the tactile stimulation device selecting the operational mode of the tactile stimulation device for a selected period of time within the pre-recorded video;

graphically representing each of the received one or more commands for the tactile stimulation device on the displayed timeline according to their selected periods of time within the pre-recorded video;

annotating the video file with the received one or more commands for the tactile stimulation device according to the associated selected periods of time within the pre-recorded video;

storing or accessing the annotated video file on a host device that is connected to a display device and wirelessly paired to the tactile stimulation device that is separate and distinct from the tactile stimulation device; and using the host device to display the annotated video file on the display device as an operation of the tactile stimulation device is controlled according to the one or more commands and the associated selected periods of time.

2. The method of claim 1, further including, uploading the annotated video file to a file sharing platform.

3. The method of claim 1, wherein the one or more commands along with the associated selected periods of time are annotated within the video file as metadata or as subtitle information.

4. The method of claim 1, wherein the displayed control panel is further configured for selecting at least one operational parameter for each of the at least one operation mode of the tactile stimulation device, and each of the received one or more commands further selects the at least one operational parameter, the selected operational parameter is also graphically represented on the displayed timeline, and the selected operational parameter is also saved as part of the one or more commands.

5. The method of claim 1, wherein the tactile stimulation device is a sex toy.

6. The method of claim 1, wherein the video playback scrubber and the control panel are displayed together on a personal computer, a tablet computer, a smartphone, or a virtual reality/augmented reality headset.

7. The method of claim 1, wherein the video playback scrubber is displayed on a computer monitor or television and the control panel is displayed on a tablet computer or a smartphone.

8. The method of claim 1, wherein the displayed timeline spans an entire playing time of the video file.

9. The method of claim 1, wherein the tactile stimulation device is identified prior to displaying the control panel and the control panel is displayed according to particular capabilities of the identified tactile stimulation device.

10. The method of claim 9, wherein the tactile stimulation device is identified via a wired connection or a paired wireless connection.

11. The method of claim 1, wherein the display device is part of a personal computer, tablet computer, smartphone, or a virtual reality/augmented reality headset.

12. A system for a programmable tactile stimulation device, comprising:
a tactile stimulator paired to a computer over a wired or wireless connection, the computer executing an application programmed to:
identify a type of the tactile stimulator;
display a video playback scrubber on a display device of the computer, the video playback scrubber being configured to display a video file of a pre-recorded video in conjunction with a timeline showing a time and relative position of a present frame of the video file and providing navigation controls for playing, advancing, and regressing the display of the video file;
display a control panel for the identified type of the tactile stimulator on the display device of the computer, the control panel configured for selecting at least one operational mode of the tactile stimulator;
receive one or more commands for the tactile stimulator via either the displayed control panel or by keyboard, each of the one or more commands for the tactile stimulator selecting the operational mode of the tactile stimulator for a selected period of time within the pre-recorded video;
graphically represent each of the received one or more commands for the tactile stimulator on the displayed timeline according to their selected periods of time within the pre-recorded video;
annotate the video file with the received one or more commands for the tactile stimulator according to the associated selected periods of time within the pre-recorded video;
store or access the annotated video file on the computer paired to the tactile stimulator over the wired or wireless connection, the computer being separate and distinct from the tactile stimulation device;
display the annotated video file on the display device of the computer; and
control the operation of the tactile stimulator in accordance with the one or more commands over the wired or wireless connection in synchronization with the display of the annotated video file in accordance with the selected periods of time.

13. The system of claim 12, wherein the computer is a personal computer, a tablet computer, or a smartphone.

14. The system of claim 12, further comprising a file sharing server configured to receive the one or more commands along with the associated selected periods of time and share the received one or more commands along with the associated selected periods of time to a plurality of users.

15. A computer system comprising:
a processor; and
a non-transitory, tangible, program storage medium, readable by the computer system, embodying a program of instructions executable by the processor to perform method steps for programming a tactile stimulation device, the method comprising:
displaying a video playback scrubber, the video playback scrubber being configured to display a video file of a pre-recorded video in conjunction with a timeline showing a time and relative position of a present frame of the video file and providing navigation controls for playing, advancing, and regressing the display of the video file;
displaying a control panel for selecting at least one operational mode of the tactile stimulation device and for selecting at least one operational parameter for the at least one operational mode;
receiving one or more commands for the tactile stimulation device, either via the displayed control panel or by keyboard, each of the one or more commands for the tactile stimulation device selecting the operational mode of the tactile stimulation device, along with an operational parameter for the selected operational mode, for a selected period of time within the pre-recorded video;
graphically representing each of the received one or more commands for the tactile stimulation device on the displayed timeline according to their selected periods of time within the pre-recorded video;
annotating the video file with the received one or more commands for the tactile stimulation device along with the associated selected periods of time within the pre-recorded video;
storing or accessing the annotated video file on a host device that is connected to a display device and wirelessly paired to the tactile stimulation device that is separate and distinct from the tactile stimulation device; and using the host device to display the annotated video file on the display device as an operation of the tactile stimulation device is controlled according to the one or more commands and the associated selected periods of time.

16. The computer system of claim 15, wherein the one or more commands along with the associated selected periods of time are annotated within the video file as metadata or as subtitle information.

17. The computer system of claim 15, wherein the tactile stimulation device is identified via a paired wired or wireless connection prior to displaying the control panel and the control panel is displayed according to particular capabilities of the identified tactile stimulation device.

18. The computer system of claim 15, wherein the at least one operational mode includes vibration and the at least one operational parameter includes vibration speed.

19. The method of claim 1, wherein the host device is a set top box.

20. The method of claim 1, wherein the host device is a computer system.

* * * * *